US006357624B1

(12) United States Patent
Brown

(10) Patent No.: US 6,357,624 B1
(45) Date of Patent: Mar. 19, 2002

(54) LID DISPENSER

(76) Inventor: Anthony P. Brown, Rt. 1, Box 1474, Cadet, MO (US) 63630

(*) Notice: Subject to any disclaimer, the term of this patent is extended or adjusted under 35 U.S.C. 154(b) by 0 days.

(21) Appl. No.: 09/587,196

(22) Filed: Jun. 5, 2000

(51) Int. Cl.[7] .................................. B65G 59/00

(52) U.S. Cl. .................. 221/312 A; 221/280; 221/279; 221/226; 221/290; 221/289; 221/295; 221/311

(58) Field of Search ............................ 221/280, 279, 221/226, 312 R, 290, 289, 295, 311

(56) References Cited

U.S. PATENT DOCUMENTS

| | | | | |
|---|---|---|---|---|
| 3,642,170 A | | 2/1972 | Shelley | 221/226 |
| 3,724,719 A | * | 4/1973 | Engler et al. | 221/279 |
| 3,767,082 A | | 10/1973 | House | 221/279 |
| 3,768,694 A | * | 10/1973 | Miller | 221/221 |
| 3,861,563 A | | 1/1975 | Lisbin et al. | 221/279 |
| 3,864,898 A | * | 2/1975 | West | 53/328 |
| 3,955,699 A | | 5/1976 | Amberg et al. | 215/246 |
| 4,033,478 A | * | 7/1977 | House | 221/279 |
| 4,234,101 A | * | 11/1980 | Pastore | 221/241 |
| 4,234,153 A | * | 11/1980 | Mitchell | 221/34 |
| 4,319,441 A | * | 3/1982 | Credle | 53/131 |
| 4,529,093 A | * | 7/1985 | Ruiz | 211/59 |
| 4,574,981 A | | 3/1986 | Jewett | 221/283 |
| 4,601,160 A | * | 7/1986 | Heisler | 53/485 |
| 4,643,334 A | | 2/1987 | Steele | 221/63 |
| 4,683,706 A | * | 8/1987 | Harper | 53/485 |
| 4,949,526 A | * | 8/1990 | Brogna et al. | 53/306 |
| 5,000,345 A | * | 3/1991 | Brogan et al. | 221/5 |
| 5,012,952 A | | 5/1991 | Franz | 221/36 |
| 5,038,969 A | * | 8/1991 | Berger | 221/40 |
| 5,131,562 A | | 7/1992 | Brown | 221/41 |
| 5,383,571 A | * | 1/1995 | Gunderson | 221/223 |
| 5,819,982 A | | 10/1998 | Brown | 221/226 |
| 5,845,791 A | | 12/1998 | Kawolics | 211/49.1 |
| 5,944,220 A | | 8/1999 | Garske et al. | 221/312 A |
| 5,960,969 A | * | 10/1999 | Gunderson | 221/220 |

* cited by examiner

*Primary Examiner*—Christopher P. Ellis
*Assistant Examiner*—Michael E. Butler
(74) *Attorney, Agent, or Firm*—Grace J. Fishel

(57) ABSTRACT

A lid dispenser for storing and dispensing plastic drink lids. The dispenser has an elongated body within which the lids are stacked upside down and a dispensing slot in a sidewall facing a user. A gravity biased finger rides in a vertical trackway in a sidewall opposite the dispensing slot. The finger contacts the stack of drink lids, clamping the uppermost lid against the next-to-uppermost lid and tilting the uppermost lid at an angle towards the user. The uppermost lid can be grasped by the user and snapped through the dispensing slot.

6 Claims, 5 Drawing Sheets

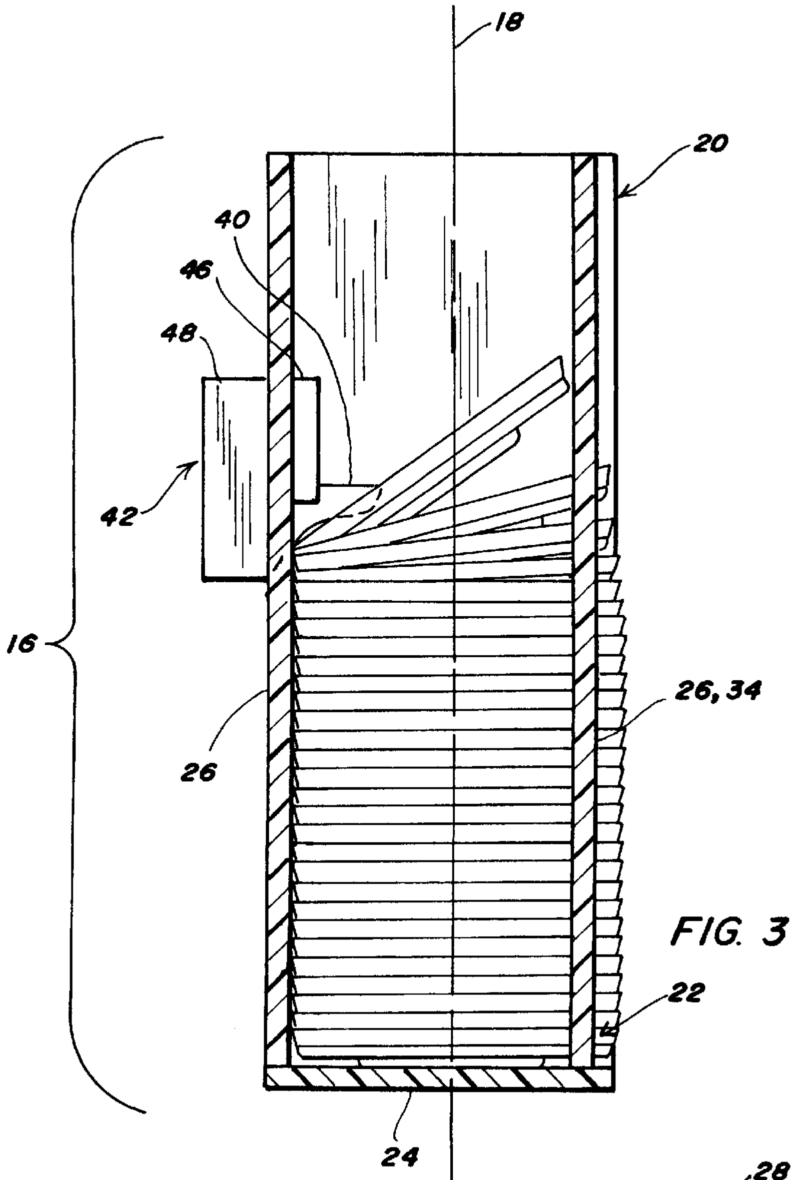
FIG. 3
FIG. 4
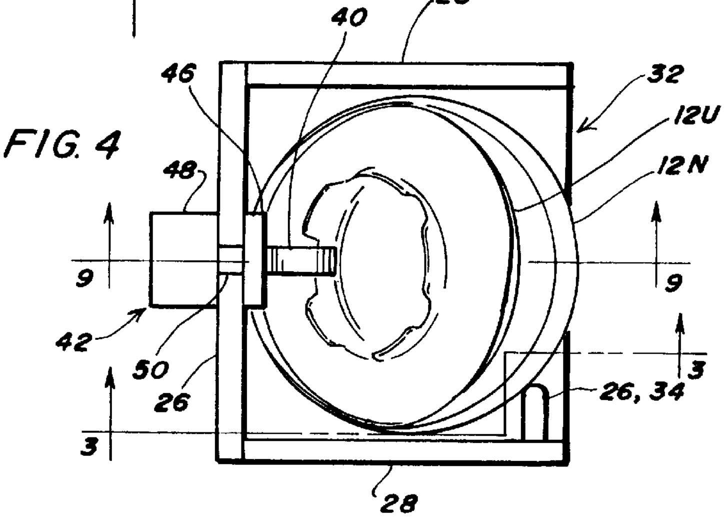

LID DISPENSER

BACKGROUND OF THE INVENTION

1. Field of the Invention

The present invention relates to a device for storing and dispensing plastic drink lids.

2. Brief Description of the Prior Art

In many fast food restaurants and convenience markets, a customer serves his own drink from a self-serve drink dispenser after he has been given a cup by a clerk or takes a cup from a cup dispenser. If he wants a lid, the customer then selects the lid from an open stack or tray. In general, the lids in the stack are presented right side up and are difficult to separate because they are nested.

If the customer selects the wrong size lid or if he gets more than one lid because they stick together, he may put the unwanted lids back in the stack or tray, which tends to become more and more disordered. A lid may be handled by several different people before it is selected by the ultimate user. In those establishments where the lids are kept behind the counter with the cups, the same problem occurs except that the lids are handled by store personnel instead of the public.

The need for a sanitary dispenser for disposable lids has been recognized and several dispensers have been designed, including ones developed by the inventor of the subject dispenser. There is a continuing need, however, for a dispenser which is inexpensive to build, simple for store personnel to set up and fill with lids and easy for a customer to operate.

BRIEF SUMMARY OF THE INVENTION

In view of the above, it is an object of the present invention to provide a superior dispenser for plastic drink lids, one which can be built inexpensively and one which is simple for store personnel to set up and fill with lids and easy for a user to operate. Other objects and features of the invention will be in part apparent and in part pointed out hereinafter.

The present invention concerns a lid dispenser for storing and dispensing flexible plastic drink lids having a substantially circular closure wall and a downwardly extending peripheral skirt. The dispenser has an elongated body shaped to contain a plurality of the lids in nested, upside down relationship forming a stack. The elongated body has a longitudinal axis with a predominantly vertical orientation and a cross-section greater than the diameter of the lids to be dispensed to allow movement of such lids along the longitudinal axis of the elongated body. The elongated body also has a dispensing slot parallel to the longitudinal axis of the elongated body through which the lids are dispensed and a gravity biased finger carried by the elongated body generally opposite said dispensing slot. The gravity a biased finger is adapted to contact the peripheral skirt of the uppermost lid, clamping the uppermost lid against the next-to-uppermost lid in the stack and tilting the uppermost lid at an acute angle relative to the longitudinal axis of the elongated body thereby facilitating dispensing of the said lid through the dispensing slot.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which two of various possible embodiments of the invention are illustrated, corresponding reference characters refer to corresponding parts throughout the several views of the drawings in which:

FIG. 3 is a cross-section taken along line 3—3 in FIG. 4;

FIG. 4 is a top end view of a single device for storing and dispensing plastic drink lids;

DETAILED DESCRIPTION OF THE INVENTION

Figure 1:
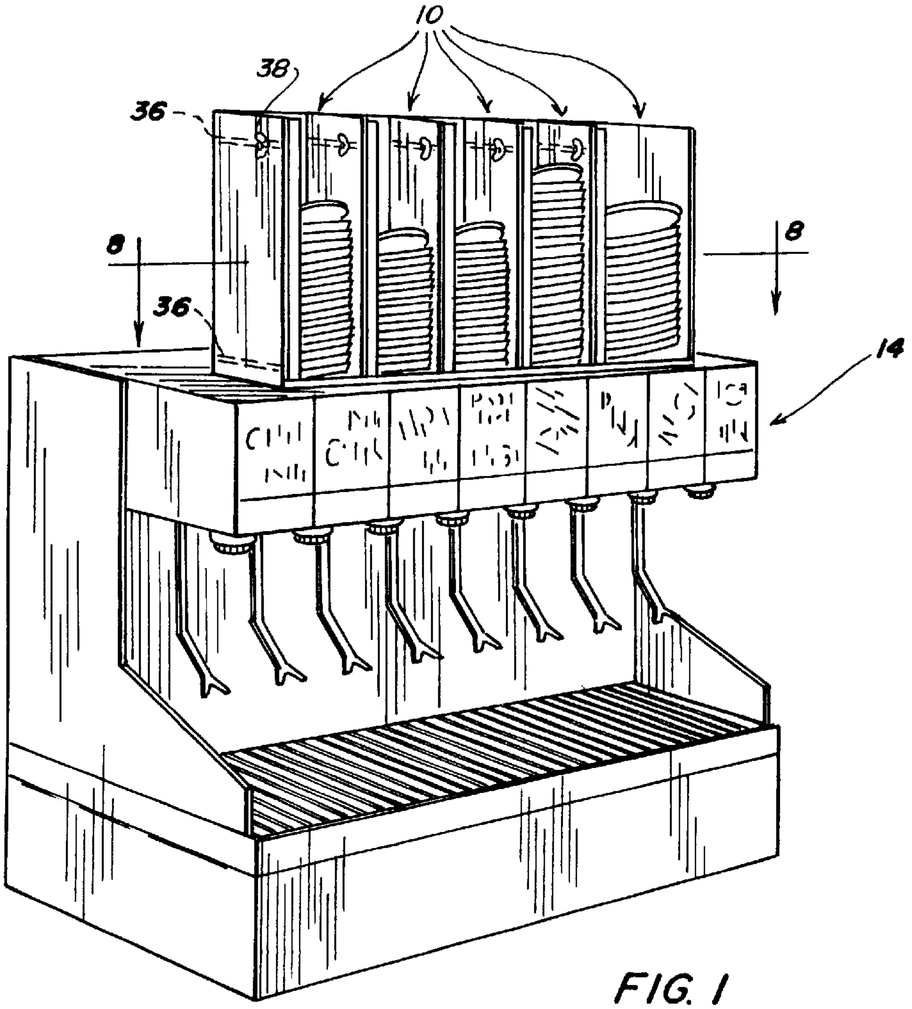
FIG. 1 is a perspective view in isometric format of a self-serve dispensing tower for drinks shown with a row of devices for storing and dispensing plastic drink lids in accordance with the present invention.

Referring to the drawings more particularly by reference character, reference numeral 10 refers to a device for storing and dispensing a plurality of flexible plastic drink lids 12 such as might be used with soft drinks and the like. Device 10 may be provided in different sizes to accommodate different sized lids. The actual number of devices is discretionary, depending on the number of different sized lids to be dispensed. As shown in FIG. 1, five units of device 10, for five different sized lids, are mounted on a self-serve drink dispensing tower 14. It will be understood, however, that device 10 may be provided as a single unit or in other multiples and placed on a counter, built into a cabinet, etc. Device 10 may also be combined with cup, straw, stir stick or other such dispensers.

Each device 10 has an elongated body 16 shaped to contain a plurality of lids 12 of a particular diameter in nested, upside down relationship forming a stack. Elongated body 16 has a longitudinal axis 18 with a predominantly vertical orientation and a cross-section somewhat greater than the diameter of lids 12 to be dispensed to allow movement of the lids along longitudinal axis 18. Elongated body 16 has a top end 20 and a bottom end 22, both of which may be open or closed. As shown in the drawings, it is preferred that top end 20 be open and bottom end 22 be closed providing a floor 24 upon which lids 12 are stacked. Top end 20 may be closed with a removable cap (not shown), etc. When bottom end 22 is open, the surface upon which device 10 is placed may serve the same function as floor 24.

Figure 5:
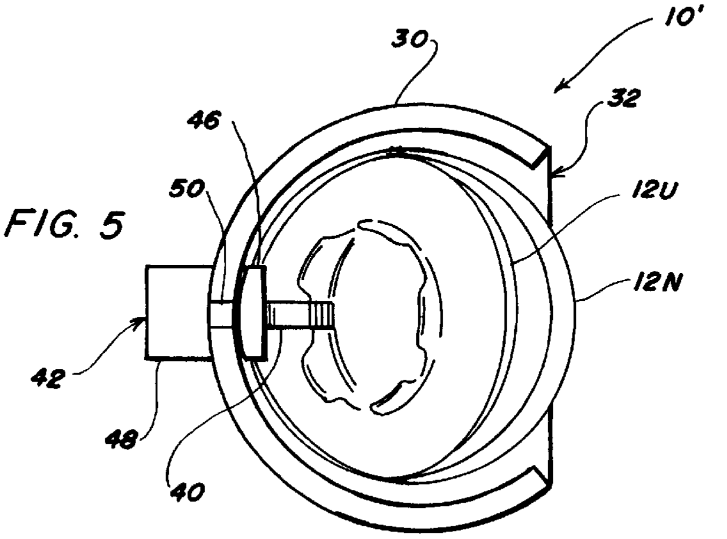
FIG. 5 is a top end view of a second embodiment of the device.
Figure 10:
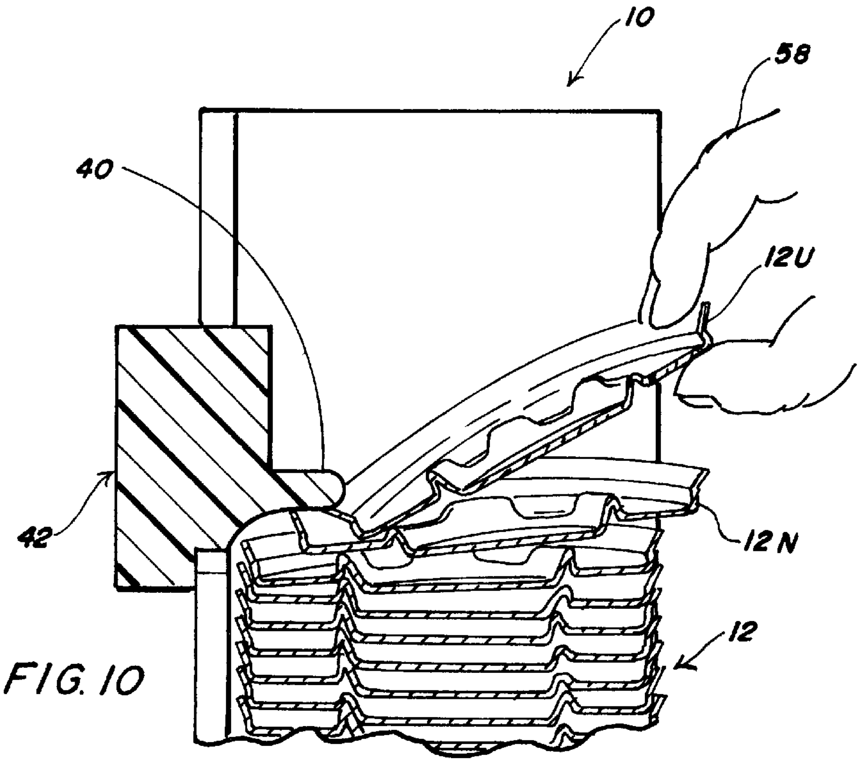
Figure 11:
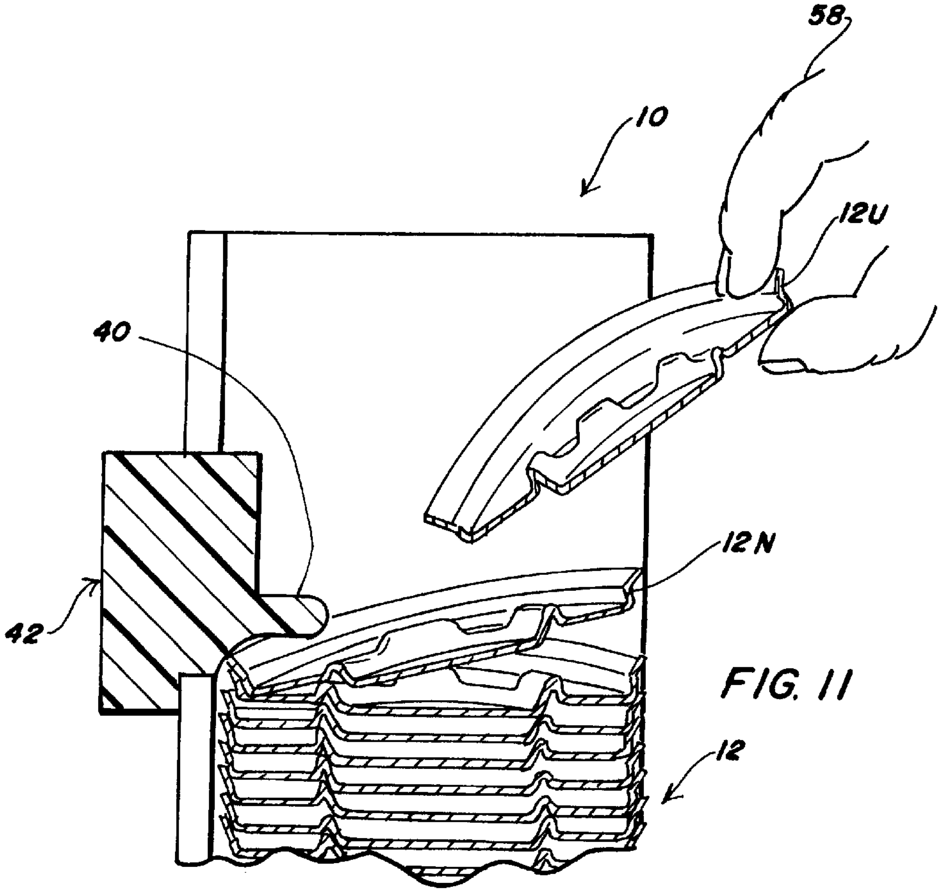

As shown in the drawings, elongated body 16 may be rectangular in cross-section, with first and second pairs of opposed sidewalls 26, 28 (FIG. 4), or circular with a continuous curved sidewall 30 (device 10' in FIG. 5), although other shaped cross-sections that substantially conform to lids 12 are contemplated. A dispensing slot 32 is provided in elongated body parallel to longitudinal axis 18 through which lids 12 are dispensed. Slot 32 preferably extends from floor 24 to top end 20 and is wide enough that a selected lid can be snapped through slot 32 by grasping the lid and pulling it laterally as shown in FIGS. 10–11.

Figure 8:
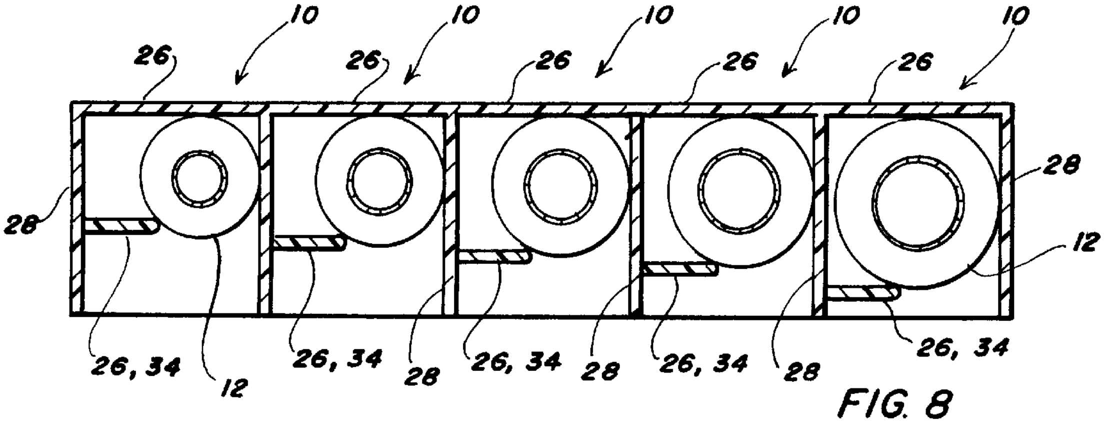
FIG. 8 is a section taken along line 8—8 in FIG. 1.
Figure 6:
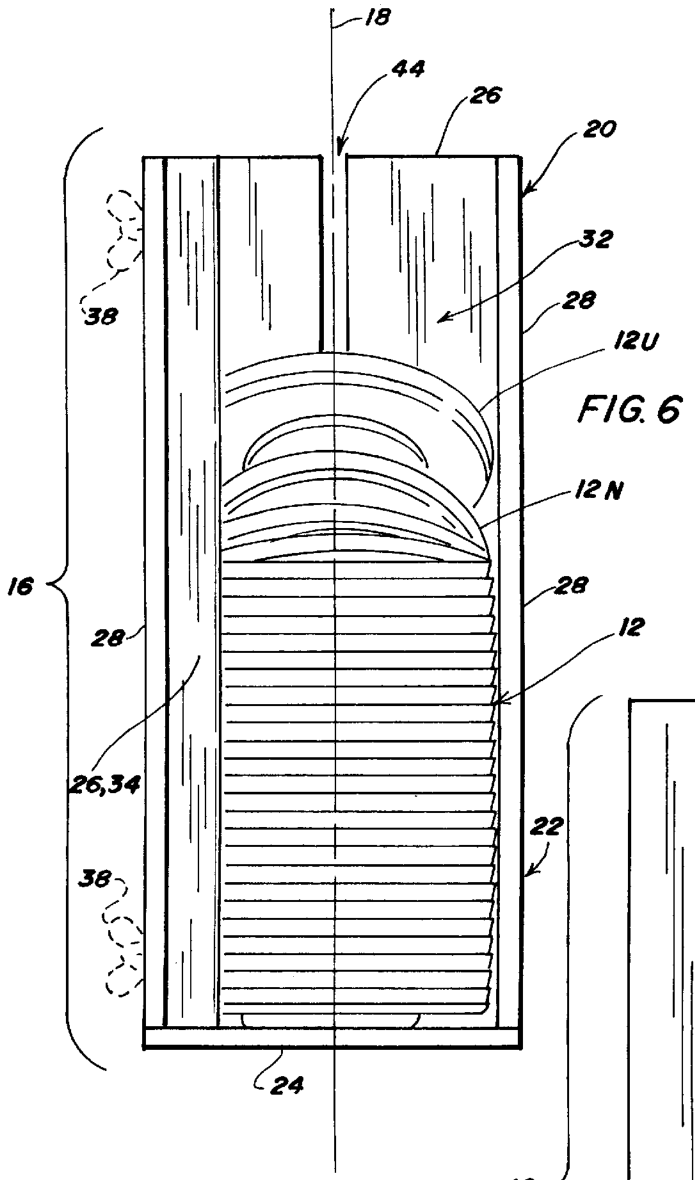
FIG. 6 is front elevation of the device shown in FIGS. 3–4.
Figure 7:
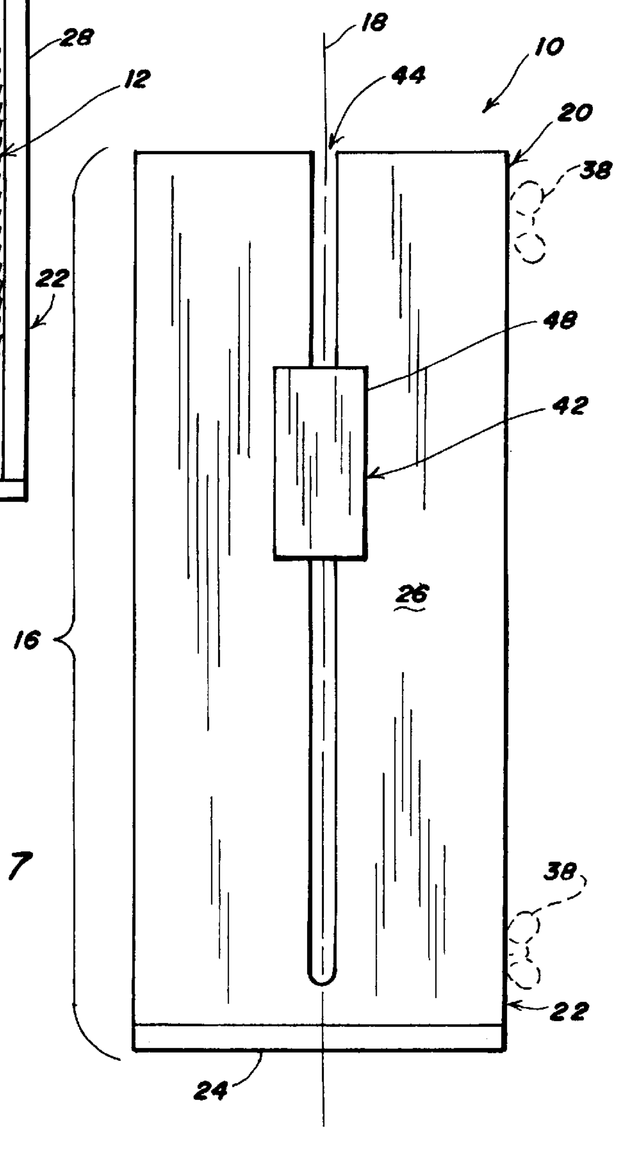
FIG. 7 is rear elevation of the device shown in FIGS. 3–4.

When elongated body 16 is rectangular in cross-section, one of sidewalls 26 may comprise a panel 34. Panel 34 may be mounted for sliding movement along channels 36 provided in an adjacent sidewall 28. One or more bolts, passing through channels 36, may be provided along an edge of panel 34 for securing the panel in a selected position along channels 36 with wing nuts 38. As best seen in FIG. 8, panel 34 pushes lids 12 against opposite sidewall 26 and other sidewall 28, providing three-point contact and stabilizing the stack. In FIG. 1, bolts with wing nuts 38 are only provided adjacent top end 20 of elongated body 16, whereas in single unit devices 10 as shown in FIGS. 6 and 7, bolts with wing nuts 38 may be provided at the bottom also. In FIGS. 3–4, the side adjustment of panel 34 is omitted, as the feature is optional.

Figure 9:
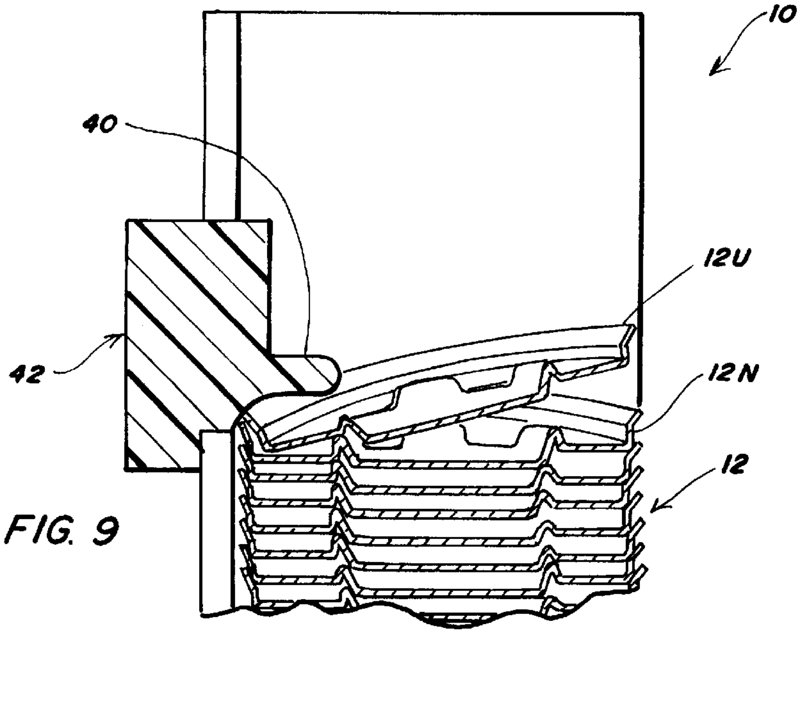
FIGS. 9–11 are fragmentary, enlarged views with FIG. 9 taken along line 9—9 in FIG. 4, illustrating successive steps in dispensing a lid.

A gravity biased finger 40 is carried on a rider 42 in a vertical trackway 44 generally parallel with longitudinal axis 18 of elongated body 16. Trackway 44 may be inside elongated body 16, outside or, as shown in the drawings, provided as a slot in one of sidewalls generally opposite dispensing slot 32. As illustrated, rider 42 is formed from a pair of plates 46, 48 joined by a stem 50. When top end 20 is open, rider 42 can be lifted out of trackway 44 while device 10 is being filled with lids 12. As shown in FIGS. 9–11, finger 40, plates 46, 48 and stem 50 may be molded as a unit, if desired, or constructed from separate parts. Finger 40 is mounted on inside plate 46 while outside plate 48 can serve as a handle for lifting finger 40 or for removing rider 42 from trackway 44. When trackway 44 is on the outside of elongated body 16, rider 42 may be confined in a box (not shown) attached to the outside of one of the sidewalls of elongated body 16 and positioned over slot 44 with finger 40 extending through the slot. Other such arrangements are contemplated and will occur to those skilled in the art.

Lids 12 are formed of a synthetic resin material and have a substantially circular closure wall 52 and a downwardly extending peripheral skirt 54. The term "downwardly" as used throughout the present specification and claims refers to the position of skirt 54 when the lid is placed over the open end of a drink container. The term "upside down" refers to the lid when the skirt is facing upwardly.

Figure 2:
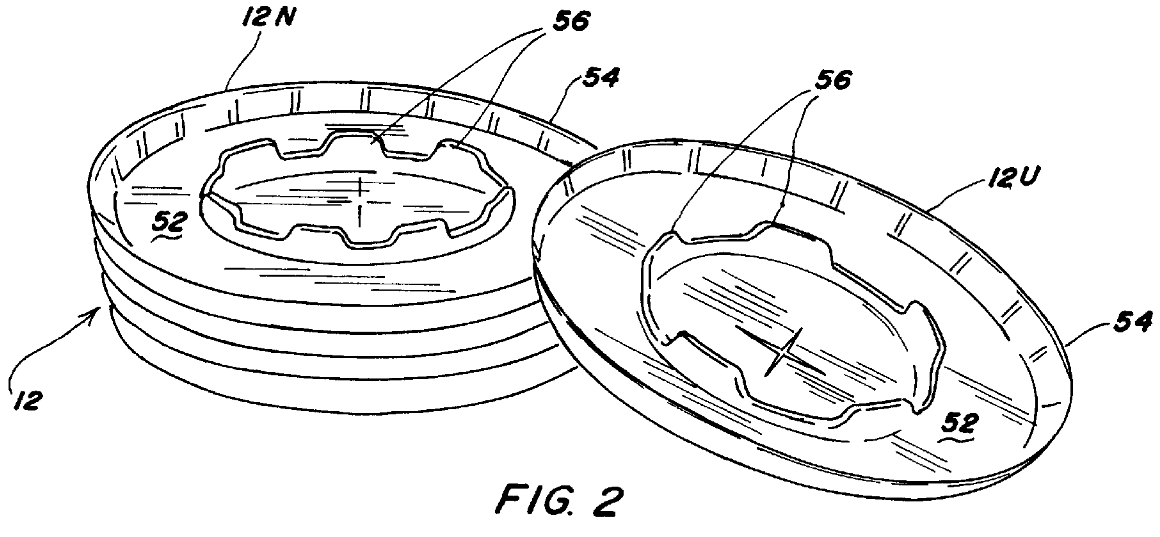
FIG. 2 is a perspective view in isometric format of a stack of plastic drink lids shown upside down with differing numbers of projections to prevent jamming of the lids.

Some lids 12 have projections 56 extending down from closure wall 52 to rest on the upper surface of the closure wall of the next underlying lid in a stack to keep the lids from becoming jammed when the stack is subjected to an axially applied load. The particular lids shown in FIG. 2 are a variation on this design wherein projections 56 comprise a plurality of feet spaced radially about one-half the radius from the lid center and depend from the closure wall 52. Lids 12 are preferably formed in groups having different numbers of projections at different angular spacing. Such lids are stacked in alternating sequence which ensures that the stacked lids will be mismatched and therefore will not become jammed. As shown in FIG. 2, an uppermost lid 12U has five feet, whereas a next-to-uppermost lid 12N has seven. Other lids may have six feet, etc.

In use, an appropriately sized device 10 is selected, preferably making, or being adjusted to make, three-point contact with lids 12. Rider 42 is lifted towards top end 20 or removed from trackway 44 and device 10 filled with lids 12. Rider 42 is then reinstalled in trackway 44 (if removed) and then released, allowing finger 40 to be biased by gravity into contact with peripheral skirt 54 of uppermost lid 12U. Gravity biased finger 40 clamps the uppermost lid against next-to-uppermost lid 12N in the stack and tilts the uppermost lid at an acute angle relative to longitudinal axis 18 of elongated body 16. The angle at which uppermost lid 12U is held and the number of lids fanned out in the stack depend on several parameters, including the weight applied by finger 40, the length of the finger and the angle that finger 40 makes with uppermost lid 12U.

As shown in FIGS. 9–11, uppermost lid 12U is held at an angle towards a user 58. When user 58 grasps uppermost lid 12U and pulls it laterally, finger 40 rides up and over peripheral skirt 54 while next-to-uppermost lid 12N remains clamped in the stack. As uppermost lid 12U is snapped through dispensing slot 32, finger 40 is gravity biased against next-to-uppermost lid 12N, completing the cycle.

If finger 40 is heavy, too many lids will be fanned in the stack. If user 58 selects an intermediate lid, instead of uppermost lid 12U, all of the lids above the selected lid will be dispensed when the selected lid is pulled through dispensing slot 32. On the other hand, if finger 40 is too light, uppermost lid 12U will not be fanned up and next-to-uppermost lid 12N will not be adequately clamped such that both lids will tend to come out when the uppermost lid is pulled.

The length of finger 40 and the angle it makes with uppermost lid 12U also affect the number of lids fanned. For example, if the finger is generally parallel with closure wall 52 of uppermost lid 12U and extends farther than about one-half its radius, the stack will not fan at all. Whereas, if finger 40 just contacts peripheral skirt 54 of uppermost lid 12U, too many lids will be fanned.

For use with lids 12 of the kind shown in FIG. 2, it has been found that finger 40 preferably has a length about one-half the radius of closure wall 52 such that it contacts projections 56 and is angled upwardly from peripheral skirt 54 as shown. As illustrated, the weight of finger 40 is such that only a few lids, preferably one or two, are noticeably fanned. From the above, it should be apparent that the above-mentioned parameters (i.e., weight, length and angle of finger 40) may differ with lids 12 but can be determined empirically.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A device for storing and dispensing a plurality of flexible plastic drink lids having a substantially circular closure wall and a downwardly extending peripheral skirt, said device comprising an elongated body shaped to contain said plurality of lids in nested, upside down relationship forming a vertical stack, said elongated body having a longitudinal axis with a predominantly vertical orientation and a cross-section greater than the diameter of the lids to be dispensed to allow movement of such lids along the longitudinal axis of the elongated body, said elongated body including a vertical dispensing slot parallel to the longitudinal axis of the elongated body through which the lids are dispensed laterally, including a second slot generally parallel to the longitudinal axis of the elongated body, said second slot forming a vertical track for a gravity biased finger carried by the elongated body generally opposite said dispensing slot, said finger having a length about one-half the radius of the circular closure wall of the lids in the stack and adapted to contact the peripheral skirt of the uppermost lid, clamping the uppermost lid against the next-to-uppermost lid in the stack and tilting the uppermost lid at an acute angle relative to the longitudinal axis of the elongated body thereby facilitating dispensing of the said lid through the dispensing slot.

2. The device of claim 1 wherein the gravity biased finger slopes upwardly from the peripheral skirt of the uppermost lid.

3. A device for storing and dispensing a plurality of similar, flexible plastic drink lids having a substantially circular closure wall and a downwardly extending peripheral skirt, said device comprising an elongated body being rectangular in cross-section with first and second pairs of opposed sidewalls and a longitudinal axis with a predominantly vertical orientation, said elongated body shaped to contain said plurality of lids in nested, upside down relationship forming a vertical stack and having a cross-section greater than the diameter of the lids to allow movement of such lids along the longitudinal axis thereof, said elongated body including a vertical dispensing slot in one of the sidewalls, said slot parallel to the longitudinal axis of the elongated body through which the lids are dispensed laterally, said elongated body including a second slot in the sidewall opposite the dispensing slot, said second slot forming a vertical trackway for a gravity biased finger, said finger having a length about one-half the radius of the circular closure wall of the lids in the stack and adapted to contact the peripheral skirt of the uppermost lid, clamping the uppermost lid against the next-to-uppermost lid in the stack and tilting the uppermost lid at an acute angle relative to the longitudinal axis of the elongated body thereby facilitating dispensing of the said lid through the dispensing slot.

4. The device of claim 3 wherein the gravity biased finger slopes upwardly from the peripheral skirt of the uppermost lid.

5. The device of claim 3 adapted for use with plastic lids having feet spaced radially from the lid center and projecting downwardly from the closure wall, said feet maintaining a desired separation of adjacent lids, said finger being long enough to contact said feet on the uppermost lid.

6. The device of claim 4 wherein the elongated body has an open end and a closed end upon which the lids are stacked, said dispensing slot and said vertical trackway running from the open end substantially the length of the longitudinal axis, said finger carried by a rider in the vertical trackway, said rider comprising first and second members connected by a stem passing through the vertical trackway with the first member being on the inside of the elongated body and the second member being on the outside of the elongated body, said finger mounted on the first member and the second member forming a handle for raising and lowering the finger in the vertical trackway.

* * * * *